(12) United States Patent
Chen

(10) Patent No.: US 9,309,990 B2
(45) Date of Patent: Apr. 12, 2016

(54) PRESSURE GAUGE DEVICE FEATURING SETTING FOR AUTOMATIC SUPPLY AND TERMINATION OF PRESSURE

(71) Applicant: Chi-Wen Chen, New Taipei (TW)

(72) Inventor: Chi-Wen Chen, New Taipei (TW)

( * ) Notice: Subject to any disclaimer, the term of this patent is extended or adjusted under 35 U.S.C. 154(b) by 79 days.

(21) Appl. No.: 14/488,306

(22) Filed: Sep. 17, 2014

(65) Prior Publication Data

US 2016/0076668 A1    Mar. 17, 2016

(51) Int. Cl.
*G05D 16/20*  (2006.01)
*F16K 37/00*  (2006.01)
*G01D 13/26*  (2006.01)

(52) U.S. Cl.
CPC ........ *F16K 37/0016* (2013.01); *G05D 16/2093* (2013.01); *G01D 13/26* (2013.01); *Y10T 137/7761* (2015.04); *Y10T 137/8326* (2015.04)

(58) Field of Classification Search
CPC .............. F16K 31/02; F16K 37/00106; G05D 16/2093; G01D 13/26; G01L 19/12
USPC .......... 137/487.5, 557; 340/626; 73/709, 717, 73/723, 732, 733, 734, 753
See application file for complete search history.

(56) References Cited

U.S. PATENT DOCUMENTS

| | | | | | |
|---|---|---|---|---|---|
| 2,139,327 | A * | 12/1938 | Clason | ................... | G01L 9/0026 200/56 R |
| 2,159,702 | A * | 5/1939 | Klein | ........................ | F01M 1/20 200/56 R |
| 2,223,579 | A * | 12/1940 | Ruopp | ..................... | G01L 19/08 73/709 |
| 2,565,434 | A * | 8/1951 | Kocmich | .............. | G01L 9/0026 191/1 R |
| 2,741,987 | A * | 4/1956 | Murphy | .............. | F04D 15/0209 200/56 R |
| 3,664,370 | A * | 5/1972 | Warnow | ................. | A61M 16/00 128/204.23 |
| 3,992,945 | A * | 11/1976 | Judson | ....................... | G01L 9/02 338/40 |
| 4,613,851 | A * | 9/1986 | Hines | ....................... | G01L 19/12 340/614 |
| 4,906,977 | A * | 3/1990 | Jong | ......................... | G01L 19/12 137/557 |
| 5,104,295 | A * | 4/1992 | Wong | ..................... | G01D 13/26 417/234 |
| 5,121,109 | A * | 6/1992 | Murphy | .................. | G01D 13/26 335/205 |
| 5,357,242 | A * | 10/1994 | Morgano | ................ | B63C 11/18 340/626 |
| 5,612,496 | A * | 3/1997 | Huang | ................ | G01L 19/0618 73/709 |
| 5,640,992 | A * | 6/1997 | Huang | ..................... | G01L 7/043 137/487.5 |
| 5,700,956 | A * | 12/1997 | Huang | ..................... | G01L 19/12 200/81.8 |
| 6,636,155 | B2 * | 10/2003 | Elizondo-Salinas | ..... | G08B 5/24 116/270 |
| 7,509,848 | B2 * | 3/2009 | Chen | ....................... | G01L 19/12 73/146 |
| 7,874,807 | B2 * | 1/2011 | Hill | ......................... | F04B 35/04 417/2 |
| 8,033,239 | B2 * | 10/2011 | Chen | ...................... | G10D 11/30 116/307 |
| 2003/0206110 | A1 * | 11/2003 | Miller | ............... | A61M 16/0051 340/626 |

* cited by examiner

*Primary Examiner* — William McCalister
(74) *Attorney, Agent, or Firm* — Leong C. Lei

(57) ABSTRACT

Disclosed is a pressure gauge device featuring setting for automatic supply and termination of pressure, which includes a pressure gauge, a rotary knob, a rotary knob conductive piece, a rotary knob indicator, and a control device. The pressure gauge includes a hand sweep zone and an electrically conductive indication hand is arranged in the hand sweep zone. The pressure gauge includes a resetting conductive piece. The rotary knob is coupled to the rotary knob conductive piece and the rotary knob indicator and is set outside an outer circumference of the hand sweep zone of the pressure gauge. The resetting conductive piece and the rotary knob indicator are each set in the hand sweep zone and located on a rotation path of the indication hand. The resetting conductive piece and the rotary knob indicator are each in electrical connection with the control device.

7 Claims, 4 Drawing Sheets

PRESSURE GAUGE DEVICE FEATURING SETTING FOR AUTOMATIC SUPPLY AND TERMINATION OF PRESSURE

TECHNICAL FIELD OF THE INVENTION

The present invention generally relates to a pressure gauge device featuring setting for automatic supply and termination of pressure, and more particularly to a device that is mountable to a portable pressure source device (such as an air compressor and an air charging device) and comprises a pressure gauge that is provided with a resetting conductive piece and a rotary knob indicator to individually form electrical connection with a control device that controls the external pressure source device for termination or activation of pressure supply (such as supplying gas or liquid), whereby the rotary knob indicator is selectively settable at a predetermined level of pressure so that when an indication hand of the pressure gauge rotates and contacts the rotary knob indicator, indicating the pressure supply of the external pressure source device reaches the predetermined level of pressure, the control device receives an electrical signal to control the external pressure source device to terminate the supply of pressure; and when the indication hand returns and contacts and the resetting conductive piece and then separates therefrom, the control device receives another electrical signal to control and activate the external pressure source device to start supply of pressure thereby an effect that the pressure gauge so provided features setting for automatic supply and terminal of pressure is achieved.

DESCRIPTION OF THE PRIOR ART

An air pump an air charging machine is commonly used with a pneumatic tool, or for inflating or charging air into an automobile tire or various types of inflatable objects to serve as a supply source of air or gas. Thus, in the DIY (Do-It-Yourselves) field of operations, the role of the air charging machine, besides being a necessary tool for home improvement or for general use in a workshop, is also a must for emergency events related to automobile tire repair.

Each type of inflatable objects has an optimum rated pressure level, which the inflatable object can bear. Risk of explosion of the inflatable object may result is the inflatable object is charged with excessive pressure. In the charging process, to provide a user with a clear indication of the pressure that the inflatable object is currently taking, a pressure gauge is often provided on the air charging machine and an indication hand of the pressure gauge indicates the current level of pressure in order to display the pressure that the inflatable object currently takes and thus, charging the inflatable object to an excessive pressure level that leads to explosion of the inflatable object can be avoided.

However, the conventional pressure gauge provides only the reading of the current pressure. A user must keep an eye on the pressure level that the indication hand of the pressure gauge indicates during an air charging process in order to prevent the inflatable object from being charged to an excessive pressure that leads to a risk of explosion.

SUMMARY OF THE INVENTION

In view of the above drawbacks and problems, the primary object of the present invention is to provide a pressure gauge device featuring setting for automatic supply and termination of pressure, which comprises a resetting conductive piece and a rotary knob indicator provided in a pressure gauge to individually form electrical connection with a control device to allow the control device to control an external pressure source device (such as an air compressor and an air charging machine) so as to achieve functions of automatic termination or activation of pressure supply.

The present invention discloses a pressure gauge device featuring setting for automatic supply and termination of pressure, and more particularly a device that is mountable to a portable pressure source device (such as a car-carrying electrical air compressor), comprising: a pressure gauge, a rotary knob, a rotary knob conductive piece, a rotary knob indicator, and a control device. The pressure gauge comprises a hand sweep zone and an electrically conductive indication hand is arranged in the hand sweep zone. The pressure gauge comprises a resetting conductive piece. The rotary knob is coupled to the rotary knob conductive piece and the rotary knob indicator and is set outside an outer circumference of the hand sweep zone of the pressure gauge. The resetting conductive piece and the rotary knob indicator are each set in the hand sweep zone and located on a rotation path of the indication hand. The resetting conductive piece and the rotary knob indicator are each in electrical connection with the control device. As such, by operating the rotary knob to set the rotary knob indicator at a predetermined level of pressure, when the indication hand of the pressure gauge rotates and contacts the rotary knob indicator, the control device receives an electrical signal to control an external pressure source device to stop supplying pressure and when the indication hand contacts the resetting conductive piece and then separates therefrom, the control device receives another electrical signal to control the pressure source device to start supply pressure.

As such, the present invention comprises a resetting conductive piece and a rotary knob indicator arranged in a pressure gauge to allow the resetting conductive piece and the rotary knob indicator to individually and electrically connect to a control device so that the control device may control an external pressure source device to terminate or supply of pressure. To use, the rotary knob indicator is set at a predetermined level of pressure. When the indication hand of the pressure gauge rotates and contacts the rotary knob indicator, indicating the pressure supply of the external pressure source device reaches the predetermined level of pressure, the control device receives an electrical signal to control the external pressure source device to stop supplying pressure and when the indication hand gets into contact with the resetting conductive piece and the separates therefrom, the control device receives another electrical signal to control the external pressure source device to start supplying of pressure, whereby an effect of setting for automatic supply and termination of pressure of the pressure gauge can be achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
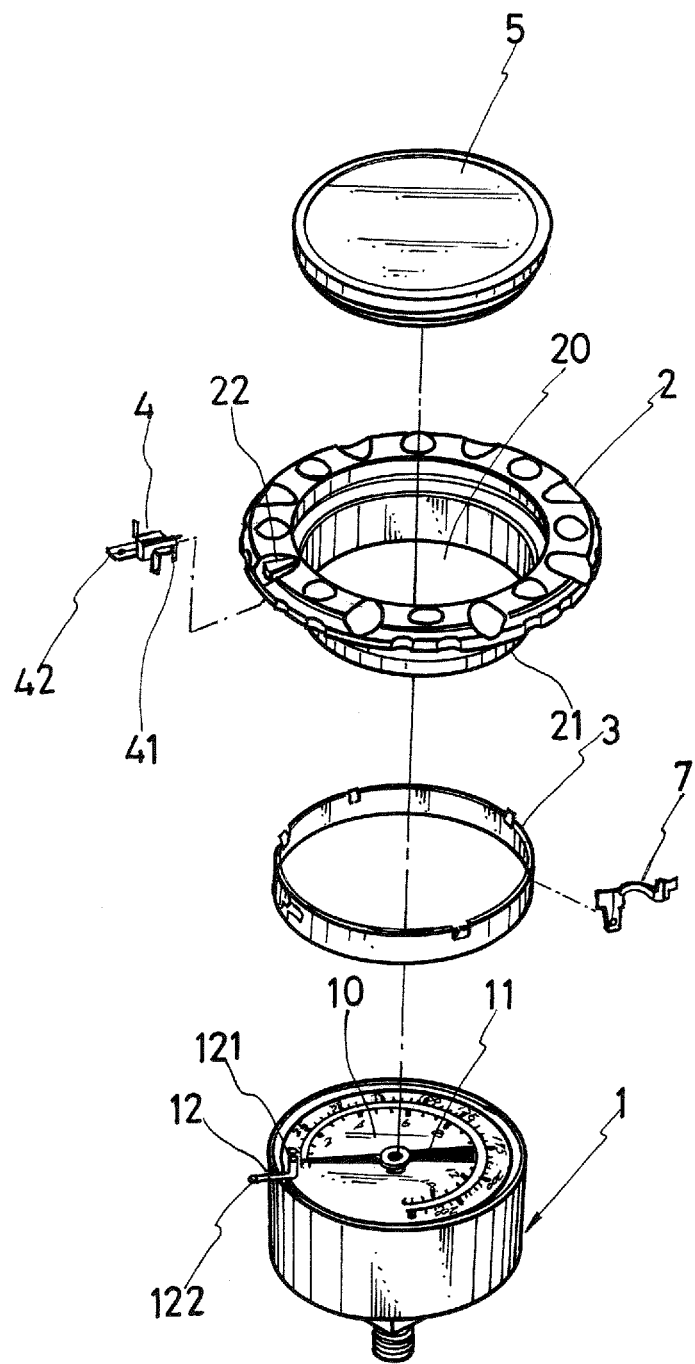
FIG. 1 is an exploded view showing a pressure gauge device according to the present invention.
Figure 2A:
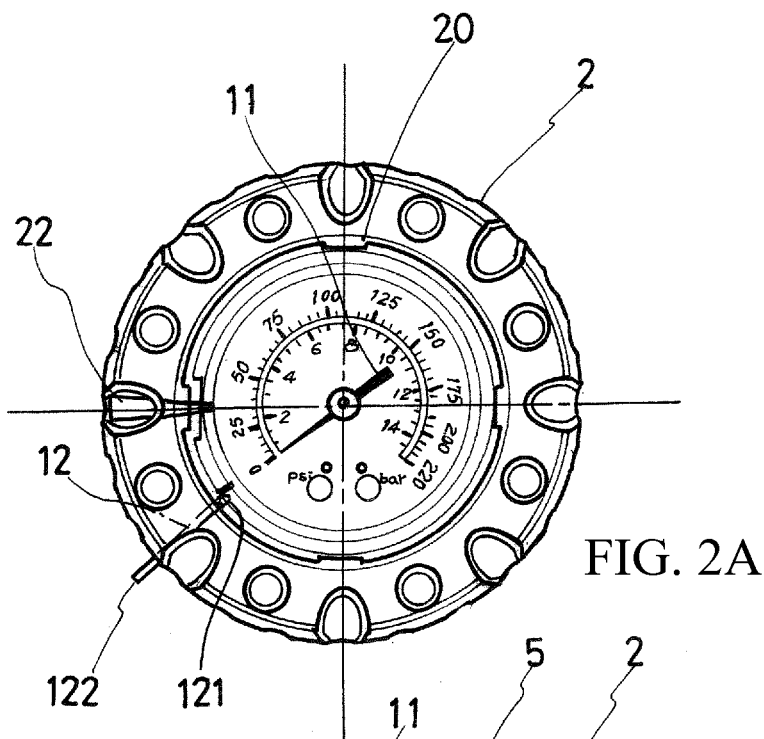
FIG. 2A is a top plan view of the pressure gauge device according to the present invention.
Figure 2B:
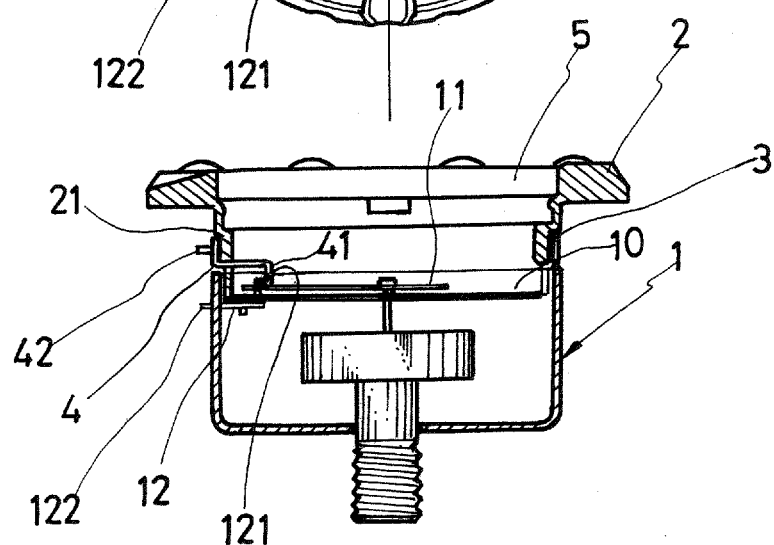
FIG. 2B is a cross-sectional view of the pressure gauge device according to the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-6, the present invention discloses a pressure gauge device featuring setting for automatic supply and termination of pressure, and more particularly a device mountable to a portable electrical pressure source device (such as a car-carrying electrical air compressor). The pressure gauge device according to the present invention comprises: a pressure gauge 1, a rotary knob 2, a rotary knob conductive piece 3, a rotary knob indicator 4, a bezel 5, and a control device 6.

The pressure gauge 1 comprises a hand sweep zone 10 formed on a surface thereof. The hand sweep zone 10 comprises pressure markings formed thereon. The hand sweep zone 10 comprises an electrically conductive indication hand 11 arranged thereon. The pressure gauge 1 further comprises a resetting conductive piece 12. The resetting conductive piece 12 is electrically conductive and has an end on which a resetting constraint peg 121 is formed and an opposite end forming a resetting conduction terminal 122. The resetting constraint peg 121 is arranged in the hand sweep zone 10 and located on a rotation path of the indication hand 11. The pressure gauge 1 can be mounted to a portable electrical pressure source device (such as a car-carrying electrical air compressor).

The rotary knob 2 is fit outside an outer circumference of the hand sweep zone 10 of the pressure gauge 1. The rotary knob 2 comprises a hollowed portion 20 formed therein. The hollowed portion 20 corresponds in size and location to the hand sweep zone 10 of the pressure gauge 1 so that the pressure markings arranged in the hand sweep zone 10 can be clearly viewed through the hollowed portion 20 of the rotary knob 2. The rotary knob 2 comprises a coupling section 21 extending from a lower edge of the hollowed portion 20. The coupling section 21 functions to couple to the pressure gauge 1 in such a way that the rotary knob 2 is rotatable with respect to the pressure gauge 1. Further, the rotary knob 2 has a top surface on which an indication mark 22 is provided. The indication mark 22 can be for example an arrow or any other figure.

The rotary knob conductive piece 3 is fit over and coupled to the coupling section 21 of the rotary knob 2.

The rotary knob indicator 4 is mounted to the rotary knob 2 and the rotary knob indicator 4 is set at a location corresponding to the indication mark 22 of the rotary knob 2. Further, the rotary knob indicator 4 is electrically conductive and has an end forming a rotary knob engagement terminal 41 and an opposite end forming a rotary knob conduction terminal 42. The rotary knob engagement terminal 41 is arranged in the hand sweep zone 10 of the pressure gauge 1 and located on the rotation path of the indication hand 11. The rotary knob conduction terminal 42 is in contact engagement with the rotary knob conductive piece 3.

The bezel 5 allows eyesight to see therethrough and the bezel 5 is arranged in the hollowed portion 20 of the rotary knob 2.

The control device 6 comprises at least one control switch 61. The control device 6 receives and processes one or more than one electrical signals in order to perform a control of turning on or off the control switch 61.

The pressure gauge device according to the present invention can be mounted to a portable electrical pressure source device (such as a car-carrying electrical air compressor) with the control switch 61 of the control device 6 connected to a valve of a pressure source device so that the control switch 61 controls opening or closing of the pressure source device. The control device 6 is eclectically connected to the resetting conduction terminal 122 of the resetting conductive piece 12 and the rotary knob conduction terminal 42 of the rotary knob indicator 4 to form a complete circuit.

Figure 3:
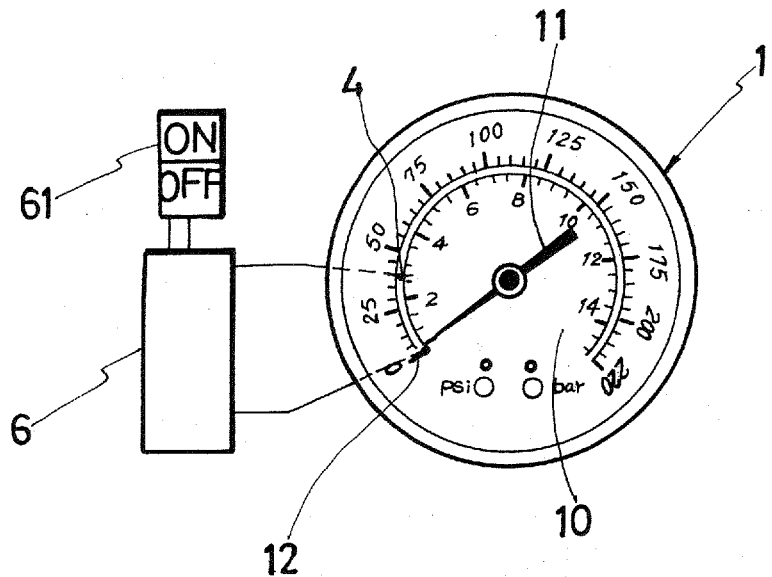
FIG. 3 is a schematic view showing an example operation of the pressure gauge device according to the present invention.
Figure 4:
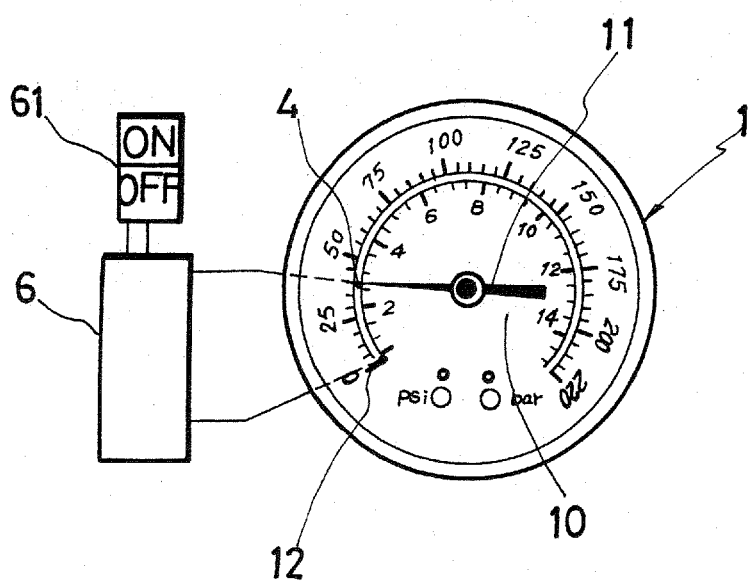
FIG. 4 is another schematic view showing the example operation of the pressure gauge device according to the present invention.
Figure 5:
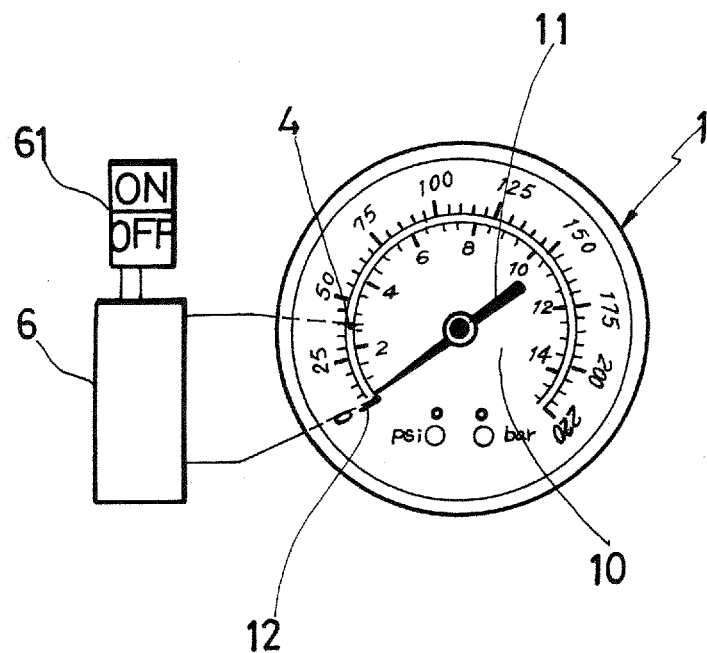
FIG. 5 is a further schematic view showing the example operation of the pressure gauge device according to the present invention.
Figure 6:
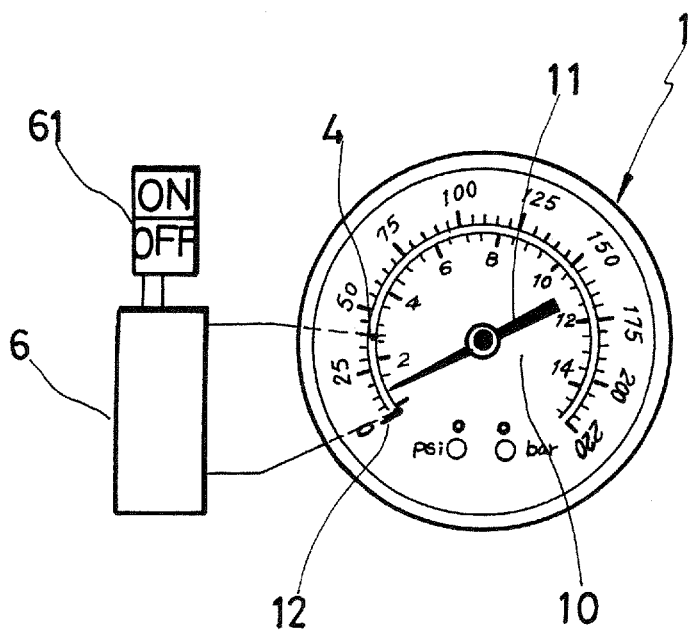
FIG. 6 is yet a further schematic view showing the example operation of the pressure gauge device according to the present invention.

An example will be given to describe the operation of the present invention. To start charging air to an inflatable object, the rotary knob 2 is first operated to set the rotary knob indicator 4 at a position corresponding to a predetermined pressure level (as shown in FIG. 3) and under this condition, the control switch 61 of the control device 6 controls the pressure source device to turn on so that the pressure source device starts charging air to the inflatable object. During the air charging process, when the indication hand 11 of the pressure gauge 1 rotates and contacts the rotary knob indicator 4 (as shown in FIG. 4), indicating the pressure supply of the external pressure source device reaches the predetermined pressure level. Under this condition, the control device 6 receives an electrical signal (such as a trigger signal for turning off the control switch 61), so that the control device 6 controls and sets the control switch 61 in an off condition, whereby the external pressure source device does not continuously charge air to the inflatable object and the inflatable object that reaches the charging pressure can be removed. Under this condition, the indication hand 11 of the pressure gauge 1 returns to a resetting position, allowing the indication hand 11 of the pressure gauge 1 to contact the resetting conductive piece 12 (as shown in FIG. 5). As such, the external pressure source device can be used for charging air to the next inflatable object. When the external pressure source device is connected to the inflatable object, due to a residual air pressure remaining inside the inflatable object, the indication hand 11 of the pressure gauge 1 is caused to raise and thus separate from the resetting conductive piece 12 (as shown in FIG. 6). Under this condition, the control device 6 receives another electrical signal (such as a trigger signal for turning on the control switch 61) and the control device 6 controls and sets the control switch 61 in an on condition, allowing the external pressure source device to charge air to the next inflatable object.

Based on the above description, in a practical application, it is possible to carry out successive and automatic inflation of four or more tires of an automobile with the pressure of each of the tire meeting a predetermined level of pressure. Thus, a capability of charging air in a precise, advanced, and convenient manner is achieved.

As such, the present invention comprises a resetting conductive piece 12 and a rotary knob indicator 4 arranged in a pressure gauge 1 to allow the resetting conductive piece 12 and the rotary knob indicator 4 to individually and electrically connect to a control device 6 so that the control device 6 may control an external pressure source device to terminate or supply of pressure (such as supplying a gas or a liquid). To use, the rotary knob indicator 4 is set at a predetermined level of pressure. When the indication hand 11 of the pressure gauge 1 rotates and contacts the rotary knob indicator 4, indicating the pressure supply of the external pressure source device reaches the predetermined level of pressure, the control device 6 receives an electrical signal to control the external pressure source device to stop supplying pressure and when the indication hand 11 gets into contact with the resetting conductive piece 12 and the separates therefrom, the control device 6 receives another electrical signal to control the external pressure source device to start supplying of pressure, whereby an effect of setting for automatic supply and termination of pressure of the pressure gauge 1 can be achieved and allowing for performance of inflation of the next inflatable object.

Further, the present invention further comprises a conductive piece 7. The conductive piece 7 is set in constant contact with the rotary knob conductive piece 3. The conductive piece 7 is connected to a predetermined external signal (such as an electrical signal) so that the external signal may be transmitted through the rotary knob conductive piece 3 to the rotary knob indicator 4.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A pressure gauge device featuring setting for automatic supply and termination of pressure, comprising:
    a pressure gauge, which comprises a hand sweep zone formed on a surface thereof, the hand sweep zone comprising an indication hand arranged thereon, the indication hand being electrically conductive, the pressure gauge comprising a resetting conductive piece, the resetting conductive piece being electrically conductive and having an end on which a resetting constraint peg is formed and an opposite end forming a resetting conduction terminal, the resetting constraint peg being arranged in the hand sweep zone and located on a rotation path of the indication hand;
    a rotary knob, which is fit outside an outer circumference of the hand sweep zone of the pressure gauge, the rotary knob comprising a hollowed portion formed therein, the hollowed portion corresponding to the hand sweep zone, the rotary knob comprising a coupling section extending from a lower edge of the hollowed portion;
    a rotary knob conductive piece, which is fit over and coupled to the coupling section of the rotary knob; and
    a rotary knob indicator, which is mounted to the rotary knob, the rotary knob indicator being electrically conductive and having an end forming a rotary knob engagement terminal and an opposite end forming a rotary knob conduction terminal, the rotary knob engagement terminal being arranged in the hand sweep zone and located on the rotation path of the indication hand, the rotary knob conduction terminal being in contact engagement with the rotary knob conductive piece.

2. The pressure gauge device featuring setting for automatic supply and termination of pressure according to claim 1 further comprising a control device, which receives and processes at least one electrical signal, the control device comprising at least one control switch, the control device controlling the control switch for turning on or off, the control device being electrically connected to the resetting conduction terminal and the rotary knob conduction terminal to form a complete circuit.

3. The pressure gauge device featuring setting for automatic supply and termination of pressure according to claim 2, wherein the indication hand of the pressure gauge is engageable with the rotary knob indicator to allow the control switch of the control device to be set in an off condition.

4. The pressure gauge device featuring setting for automatic supply and termination of pressure according to claim 2, wherein the indication hand of the pressure gauge is contactable with the resetting conductive piece and then separable therefrom to set the control switch of the control device in an on condition.

5. The pressure gauge device featuring setting for automatic supply and termination of pressure according to claim 2, wherein the control switch of the control device is connected to a valve of a pressure source device.

6. The pressure gauge device featuring setting for automatic supply and termination of pressure according to claim 1, wherein the rotary knob comprises an indication mark formed on a surface thereof, the rotary knob indicator being set at a position corresponding to the indication mark.

7. The pressure gauge device featuring setting for automatic supply and termination of pressure according to claim 1, further comprising a bezel, the bezel being mounted in the hollowed portion of the rotary knob.

* * * * *